United States Patent Office 2,910,311
Patented Oct. 27, 1959

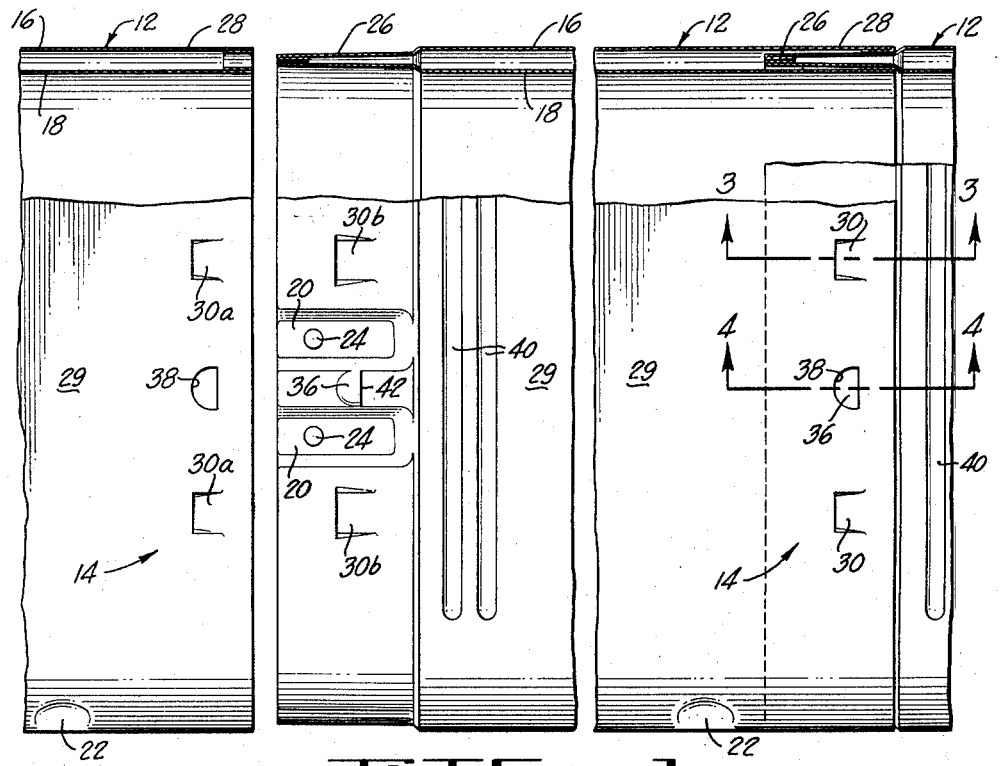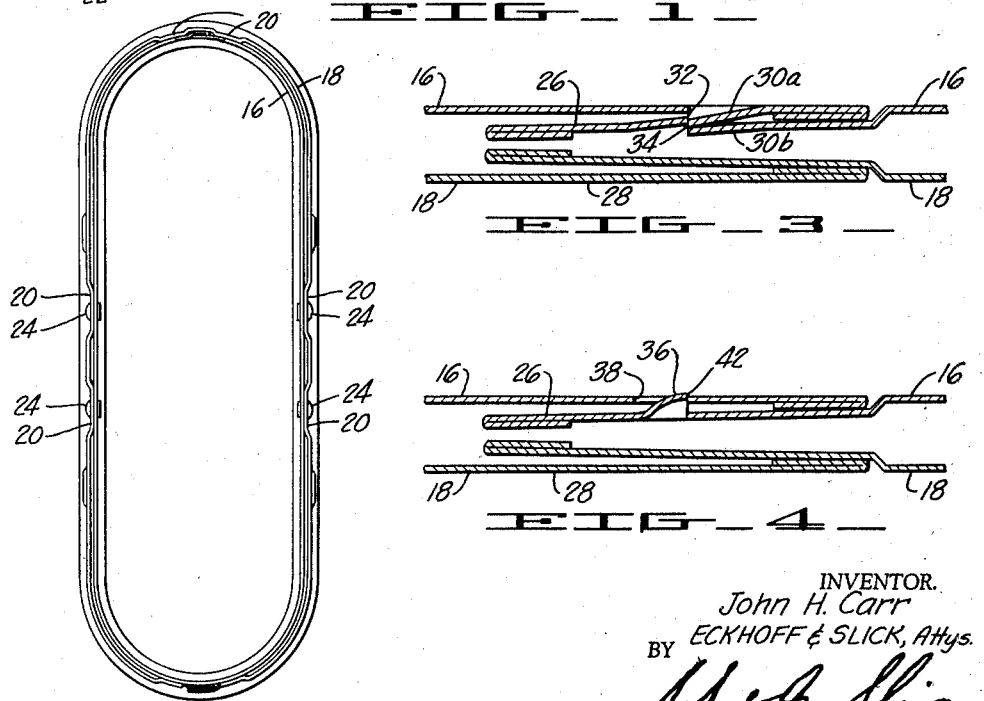

2,910,311

DOUBLE WALL PIPE COUPLING WITH LOCKING MEANS

John H. Carr, Redwood City, Calif., assignor to Dura-Vent Corporation, a corporation of Delaware Application August 2, 1957, Serial No. 675,901

2 Claims. (Cl. 285—133)

This invention relates to vent pipes of the double-wall oval type, and more particularly to devices for locking sections of such pipe together into a unitary assembly.

An object of the invention is to provide a device for joining sections of vent pipe with a safe, dependable lock which may readily be released for disassembly of the sections.

Another object of the invention is the provision of a device of the character described which is self-positioning and which may be easily and quickly engaged and released without the use of tools.

A further object of the invention is to provide a lock of the character described which is formed integrally with the vent pipe sections and uses no separate or attached parts which might be lost or damaged.

A still further object of the invention is to provide a vent section joining lock which is sturdy, simple to form, and which does not increase the exterior dimensions of the pipe.

Other objects and features of advantage will become apparent from a consideration of the following description and of the accompanying drawing forming a part of this specification.

With reference to said drawings:

Figure 1 is a side elevational view partially in section, of a vent pipe lock constructed in accordance with the present invention and showing the locked and unlocked condition of the pipe sections.

Figure 2 is an elevational view of the male end portion of one of the pipe sections.

Figure 3 is an enlarged sectional view taken substantially on the plane of line 3—3 of Figure 1.

Figure 4 is an enlarged sectional view taken substantially on the plane of line 4—4 of Figure 1.

As indicated in Figure 1 of the drawings, a series of sections 12 of flat sided vent pipe, known as "oval" pipe, may be releasably joined in a unitary assembly by a locking means 14. Each section 12 may be of any desired length and consists of inner and outer sheet metal walls 16 and 18, which are held in concentrically spaced relation by indentations 20 and 22 in the outer wall 18 and by rivets 24. For joining of the sections together to provide a continuous pipe, each section 12 has a first end portion 26 which is formed with a reduced concentric spacing, in the manner illustrated, so that such end portion may be inserted between the inner and outer walls of the opposite end 28 of the section.

In accordance with the present invention, the locking means 14 is integral with the sections 12. The integral construction is achieved by cutting and bending the sheet metal of the outer wall 18 at the flat areas 29 of the section end portions to provide complementary ramps 30 which terminate in confronting shoulders 32 and 34. The ramps and shoulders are positioned and arranged so that the shoulders 32 will automatically engage the shoulders 34 in abutting relation when the end portion 26 is inserted into the end portion 28 of the next section. To ensure a positive lock, a plurality of complementary ramps 30 are provided. As here shown, two ramps 30 are formed on opposite sides of the centerline of the flat areas 29 at both ends of the section 12, the ramps being aligned and proportioned so that the ramps 30a, in end 28, will fit into the ramps 30b, in end portion 26, in the manner shown in Figure 3 of the drawing. During assembly of the sections 12 into a continuous pipe, as the end 28 is inserted, the parts will be sprung somewhat out of line until the shoulder 34 passes the shoulder 32, at which time the inherent resilience of the sheet metal will snap the parts to the position shown in Figure 3, thus locking the sections securely against being pulled apart.

To release the locking means 14, it is necessary only to spring the outer wall 18 of end 26 inwardly by a distance sufficient for the shoulders 32 to clear the shoulders 34. This is preferably accomplished by pressing a boss 36 which is formed on wall 18 of end 26, between ramps 30b, which projects outwardly through an opening 38 in wall 18 of end 28. Stiffening ribs or corrugations 40 may be formed in wall 18 adjacent end portion 26 so that the shoulders will clear with a minimum inward displacement of the boss 36. Additional locking effect is obtained by forming a shoulder 42 on boss 36 for engagement with the edge of the opening 38 in the manner shown in Figure 4 of the drawing.

From the foregoing description, it will be seen that the vent pipe construction of the present invention provides a firm and positive lock for joining sections of double walled vent pipe which is easily and quickly engaged and released without additional tools or parts, and which is simple and sturdy due to the integral construction.

I claim:

1. A construction for a run of pipe including two lengths of flat sided oval pipe, each length having concentrically spaced inner and outer resilient walls, the walls at the end of a first pipe length being spaced apart to provide a receptacle, the walls at the end of a second pipe length being tapered from a shoulder in each spaced wall for insertion into the receptacle in the first pipe length with the end of the first pipe length abutting the shoulders in the second pipe length, a first pair of spaced rectangular tongues struck inwardly in the outer wall of the first pipe length adjacent an end thereof, a second pair of spaced rectangular tongues struck inwardly in the outer wall of the second pipe length adjacent an end thereof, each tongue in the second pipe length being adapted to fit snugly in a struck-out portion of a tongue in the first pipe length to retain the lengths in axial alignment when the two lengths are fitted together with the ends of the walls of the first length fitting against the shoulders in the walls of the second length, the end of each tongue in the outer wall of the first length abutting an end of a struck-out tongue portion in the outer wall of the second length, locking means for releasably securing two inter-engaged pipe lengths and including an opening formed in the outer wall of the first pipe length intermediate the first pair of spaced rectangular tongues, said opening including a first shoulder, a boss struck outwardly in the outer wall of the second pipe length between the second pair of spaced rectangular tongues, said boss including a second shoulder adapted to fit against the first shoulder in locking engagement, said boss being adapted to extend through said opening and means securing the inner and outer walls of the second pipe length together between the boss and each of the second pair of tongues whereby a force applied to the boss is effective to distort the end of the second pipe length sufficiently to permit disengagement and withdrawal of said second pipe length from the first pipe length.

2. A construction for a run of pipe including two lengths of flat sided oval pipe adapted for telescopic interconnection, each length having concentrically spaced inner and outer resilient walls, a first pair of spaced rectangular tongues struck inwardly in the outer wall of the first pipe length adjacent an end thereof, a second pair of spaced rectangular tongues struck inwardly in the outer wall of the second pipe length adjacent an end thereof, each tongue in the second pipe length being adapted to fit snugly in a struck-out portion of a tongue in the first pipe length to retain the lengths in axial alignment when the two lengths are fitted together, the end of each tongue in the outer wall of the first length abutting an end of a struck-out tongue portion in the outer wall of the second length, locking means for releasably securing two inter-engaged pipe lengths and including an opening formed in the outer wall of the first pipe length intermediate the first pair of spaced rectangular tongues, said opening including a first shoulder, a boss struck outwardly in the outer wall of the second pipe length between the second pair of spaced rectangular tongues, said boss including a second shoulder adapted to fit against the first shoulder in locking engagement, said boss being adapted to extend through said opening and means securing the inner and outer walls of the second pipe length together between the boss and each of the second pair of tongues whereby a force applied to the boss is effective to distort the end of the second pipe length sufficiently to permit disengagement and withdrawal of said second pipe length from the first pipe length.

References Cited in the file of this patent

UNITED STATES PATENTS

| | | |
|---|---|---|
| 1,053,743 | Paiste | Feb. 18, 1913 |
| 1,152,568 | Stearns | Sept. 7, 1915 |
| 1,661,674 | Osborn | Mar. 6, 1928 |
| 2,212,679 | White | Aug. 27, 1940 |
| 2,660,457 | Mallon | Nov. 24, 1953 |